United States Patent
Goedicke et al.

(12) 
(10) Patent No.: US 12,346,998 B2
(45) Date of Patent: Jul. 1, 2025

(54) ARTIFICIAL INTELLIGENCE (AI)-BASED STANDARDIZED UPTAKE VALUE (SUV) CORRECTION AND VARIATION ASSESSMENT FOR POSITRON EMISSION TOMOGRAPHY (PET)

(71) Applicant: KONINKLIJKE PHILIPS N.V., Eindhoven (NL)

(72) Inventors: Andreas Georg Goedicke, Aachen (DE); Bin Zhang, Cleveland, OH (US); Andriy Andreyev, Willoughby Hills, OH (US); Andre Frank Salomon, Aachen (DE); Yanfei Mao, Highland Heights, OH (US); Chuanyong Bai, Solon, OH (US); Zhiqiang Hu, Twinsburg, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 712 days.

(21) Appl. No.: 17/292,044

(22) PCT Filed: Nov. 8, 2019

(86) PCT No.: PCT/EP2019/080628
§ 371 (c)(1),
(2) Date: May 7, 2021

(87) PCT Pub. No.: WO2020/099250
PCT Pub. Date: May 22, 2020

(65) Prior Publication Data
US 2021/0398329 A1    Dec. 23, 2021

Related U.S. Application Data

(60) Provisional application No. 62/760,124, filed on Nov. 13, 2018.

(51) Int. Cl.
*G06T 11/00* (2006.01)
*G06N 3/08* (2023.01)
(Continued)

(52) U.S. Cl.
CPC .............. *G06T 11/008* (2013.01); *G06N 3/08* (2013.01); *G06N 7/046* (2013.01); *G06T 7/0012* (2013.01);
(Continued)

(58) Field of Classification Search
CPC ........ G06T 11/008; G06T 11/005; G06N 3/08
See application file for complete search history.

(56) References Cited

U.S. PATENT DOCUMENTS

2009/0212225 A1  8/2009  Zheng
2009/0273610 A1  11/2009 Busch
(Continued)

FOREIGN PATENT DOCUMENTS

CN   103339652 A   10/2013
CN   107403201 A   11/2017
(Continued)

OTHER PUBLICATIONS

International Search Report and Written Opinion of PCT/EP2019/080628, dated Jan. 30, 2020.
(Continued)

*Primary Examiner* — Pakee Fang (57) ABSTRACT

A non-transitory computer-readable medium stores instructions readable and executable by at least one electronic processor ($18_1$, $18_2$, 20) to perform an imaging method (100). The method includes: reconstructing emission imaging data to generate an emission image of a lesion; converting intensity values of the emission image to at least one standardized uptake value (SUV value) for the lesion; processing input data using a regression neural network (NN)
(Continued)

(28) to output an SUV correction factor for the lesion, wherein the input data includes at least two of (i) image data comprising the emission image or a feature vector representing the emission image, (ii) the at least one SUV value, (iii) a size of the lesion, and (iv) reconstruction parameters used in the reconstructing; and controlling a display device (24) to display at least one of (I) the SUV correction factor and (II) a corrected SUV value generated by applying the SUV correction factor to the at least one SUV value.

15 Claims, 5 Drawing Sheets

(51) Int. Cl.
*G06N 7/04* (2006.01)
*G06T 7/00* (2017.01)

(52) U.S. Cl.
CPC .. *G06T 11/005* (2013.01); *G06T 2207/10104* (2013.01); *G06T 2207/20084* (2013.01); *G06T 2207/30096* (2013.01); *G06T 2211/40* (2013.01)

(56) References Cited

U.S. PATENT DOCUMENTS

| | | | | |
|---|---|---|---|---|
| 2011/0103669 | A1* | 5/2011 | Michel | G06T 11/005 |
| | | | | 382/131 |
| 2014/0126794 | A1* | 5/2014 | Ahn | G06T 11/008 |
| | | | | 382/131 |
| 2017/0027539 | A1* | 2/2017 | Uber, III | A61B 6/566 |
| 2018/0068430 | A1 | 3/2018 | Sang | |
| 2018/0293762 | A1* | 10/2018 | Fu | G06T 11/006 |
| 2020/0175732 | A1* | 6/2020 | Andreyev | G06T 15/08 |
| 2020/0258271 | A1* | 8/2020 | Zhu | G06F 3/0483 |
| 2021/0398329 | A1* | 12/2021 | Goedicke | G06T 11/005 |
| 2022/0215601 | A1* | 7/2022 | Massanes Basi | G06T 11/005 |
| 2022/0383045 | A1* | 12/2022 | Sakhi | G06V 10/764 |
| 2023/0281809 | A1* | 9/2023 | Song | G06N 3/084 |
| | | | | 382/131 |
| 2023/0351601 | A1* | 11/2023 | Liu | G06T 7/0014 |

FOREIGN PATENT DOCUMENTS

| | | |
|---|---|---|
| WO | 2010084390 A1 | 7/2010 |
| WO | 2011010231 A1 | 1/2011 |
| WO | 2016060557 A1 | 4/2016 |

OTHER PUBLICATIONS

Wang, Yan et al "3D Conditional Generative Adversarial Networks for High-Quality PET Image Estimation at Low Does", Neuroimage, vol. 174, 2018, pp. 550-562.

Cui, Jianan et al "Deep Reconstruction Model for Dynamic PET Images", PLOS One, Sep. 2017, pp. 1-21.

Boellaard, Ronald, "Standards for PET Image Acquisition and Quantitative Data Analysis", The Journal of Nuclear Medicine, vol. 50, No. 5, Apr. 2009, pp. 11S-20S.

Kinahan, Paul E. et al "PET/CT Standardized Uptake Values (SUVs) in Clinical Practice and Assessing Response to Therapy" Semin Ultrasound CT MR. Dec. 2010, vol. 31, No. 6, pp. 496-505.

* cited by examiner

ARTIFICIAL INTELLIGENCE (AI)-BASED STANDARDIZED UPTAKE VALUE (SUV) CORRECTION AND VARIATION ASSESSMENT FOR POSITRON EMISSION TOMOGRAPHY (PET)

CROSS-REFERENCE TO PRIOR APPLICATIONS

This application is the U.S. National Phase application under 35 U.S.C. § 371 of International Application No. PCT/EP2019/080628, filed on Nov. 8, 2019, which claims the benefit of U.S. Provisional Patent Application Ser. No. 62/760,124, filed Nov. 13, 2018. These applications are hereby incorporated by reference herein.

FIELD

The following relates generally to the medical imaging arts, positron emission tomography (PET) imaging arts, medical image interpretation arts, image reconstruction arts, and related arts.

BACKGROUND

Positron emission tomography (PET), (and more generally, nuclear imaging) is an important tool for early tumor diagnoses. Image reconstruction in PET is performed by converting coincident 511 keV photon pairs registered in a PET detector (e.g., ring) gantry into an estimate of the underlying radiotracer concentration located inside the patient. In clinical applications—using specifically selected combinations of radiotracers with e.g. metabolic or receptor affine ligands—the resulting visual two-dimensional or three-dimensional (2D or 3D) representation of the radiotracer distribution is used to visualize/analyse (in-vivo) biological processes linked to specific diseases. In oncology-related diagnostic applications, assessing deviations in the "normal" (i.e. physiological) tracer-accumulation (resulting in cold or hot spots) in the image is used to reveal e.g. a locally increased glucose uptake, as present in hyper-mitotic, cancerous lesions.

Diagnostic PET imaging is thus useful to identify and quantify suspicious lesions down to the PET resolution limit (which depends on the detector geometry, crystal dimensions, positron range, sensitivity, etc.). The underlying physics in PET and a wide range of effects that impact image quality have been well understood and modeled in a diversity of reconstruction algorithms including compensation techniques for inelastic scattering, random coincidences, and even motion, which increases the chance of early tumor detection.

The quantification of PET imaging, such as lesion standard uptake value (SUV) measurement, facilitates accurate diagnosis and treatment planning. In practical clinical studies, however, lesions in a PET image often suffer quantification degradation due to partial volume effect. Resolution recovery methods based on system point spread function can be used in image reconstruction or image post-reconstruction processing to compensate the loss of lesion quantification due to partial volume effect. However, these resolution recovery methods often complicate the reconstruction algorithm, increase noise propagation in the image reconstruction and potentially create image overshoot artefact. In addition, these methods usually cannot fully recover the loss of lesion quantification accuracy and have varying performance from case-to-case and lesion-to-lesion, such that clinical user cannot confidently rely on the lesion quantitation measurements in the images even with resolution recovery enabled.

Depending on the lesion size, the local lesion/background activity ratio and other impact factors (e.g. noise regularization applied during/following image reconstruction) clinically determined SUVs during quantitative tumor assessment are often significantly underestimated. In general, these effects tend to augment the so-called partial volume effect caused by a limited spatial resolution of the scanner and/or spatial binning of the reconstructed image (i.e. the voxel/blob-size used). This leads to an increased variance in the outcome analysis not only between patients but also in subsequent studies for individuals (e.g. during treatment monitoring).

Known approaches to compensate for SUV underestimation typically focus only on single influence factors (such as the tumor size), and typically use look-up tables generated from dedicated phantom experiments in order to provide individual correction factors. However, PET imaging devices are complex and highly configurable, typically providing features such as multiple image reconstruction modes using different image resolutions, a range of different noise reduction options, and so forth, which alone or in combination may affect a subsequent SUV assessment. The resulting (multi-dimensional) parameter space is complex and difficult to accommodate using existing approaches. As a consequence, related corrections recommended for inter- and intra-patient variance reduction in tumor staging and treatment monitoring may not be applied, or may be applied incorrectly leading to an incorrect quantitative SUV adjustment.

The following discloses new and improved systems and methods.

SUMMARY

In one disclosed aspect, a non-transitory computer-readable medium stores instructions readable and executable by at least one electronic processor to perform an imaging method. The method includes: reconstructing emission imaging data to generate an emission image of a lesion; converting intensity values of the emission image to at least one standardized uptake value (SUV value) for the lesion; processing input data using a regression neural network (NN) to output an SUV correction factor for the lesion, wherein the input data includes at least two of (i) image data comprising the emission image or a feature vector representing the emission image, (ii) the at least one SUV value, (iii) a size of the lesion, and (iv) reconstruction parameters used in the reconstructing; and controlling a display device (24) to display at least one of (I) the SUV correction factor and (II) a corrected SUV value generated by applying the SUV correction factor to the at least one SUV value.

In another disclosed aspect, an imaging system includes an image acquisition device configured to obtain emission imaging data of a patient. At least one electronic processor is programmed to: reconstruct emission imaging data to generate an emission image of a lesion; convert intensity values of the emission image to at least one SUV value for the lesion; process input data using a regression neural network (NN) to output an SUV correction factor for the lesion, wherein the input data includes at least three of (i) image data comprising the emission image or a feature vector representing the emission image, (ii) the at least one SUV value, (iii) a size of the lesion, and (iv) reconstruction parameters used in the reconstructing; generate a confidence value for the SUV correction factor by repeating the processing with one or more values of the input data varied to perform a sensitivity analysis of the SUV correction factor on the one or more values; and control a display device to display at least one of (I) the SUV correction factor; (II) a corrected SUV value generated by applying the SUV correction factor to the at least one SUV value; and (III) the generated confidence value.

In another disclosed aspect, an imaging method includes: training a regression NN with training emission images of lesions labeled with ground truth SUV values; processing input data using the NN to output an SUV correction factor for the lesion, wherein the input data includes at least three of (i) image data comprising the emission image or a feature vector representing the emission image, (ii) the at least one SUV value, (iii) a size of the lesion, and (iv) reconstruction parameters used in the reconstructing; and controlling a display device to display at least one of (I) the SUV correction factor and (II) a corrected SUV value generated by applying the SUV correction factor to the at least one SUV value.

One advantage resides in providing a more accurate lesion SUV.

Another advantage resides in obtaining more accurate lesion SUVs without complicated and uncertain resolution recovery processing.

Another advantage resides in providing a statistical confidence metric for the SUV of the lesion.

Another advantage resides in allowing a user to set a reconstruction for an optimal visual image quality to detect small lesions while also obtaining an accurate quantification number for any particular lesion of interests in the image.

Another advantage resides in providing improved SUV accuracy using a neural network efficiently trained with a large pool of clinical datasets with synthetically inserted lesions with known specifications and a mathematical model of the lesion.

Another advantage resides in providing improved SUV accuracy using a neural network that makes fast, accurate and adaptive prediction about true lesion SUVs on the fly to a user with a normally reconstructed PET image and without the need to perform resolution recovery during or after reconstruction.

Another advantage resides in deriving an estimate for an expected numerical mismatch in the measurement between obtained data and training data to directly correct for the SUV-max and SUV-mean values displayed to the clinician (which improves the quantitative SUV accuracy, especially in the case of small lesions), leading to more precise and reproducible results in PET-based tumor staging and therapy response assessment.

Another advantage resides in providing variability estimations (i.e. statistical confidence values) for the displayed SUV-max and SUV-mean values, related e.g. to the specific lesion shape/size, tracer activity contrast and spatial image noise properties.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

DETAILED DESCRIPTION

In quantitative PET, intensity values are converted to SUV values. However, error in the SUV values of a small lesion can be introduced by factors such as partial volume effects, system blurriness, or noise. The first two factors tend to spread the enhanced uptake at the lesion over an artificially larger area, typically (though not necessarily) leading to an underestimate of the average and/or maximum SUV value of the lesion. The error magnitude can depend on numerous system factors, such as voxel size, reconstruction parameters (including post-reconstruction filtering which can impact blurriness), and so forth, and also may depend on lesion size (smaller lesions are more strongly affected by partial volume effects and blurring). Average and/or maximum SUV values of the lesion are sometimes used for clinical decision making, so that SUV errors are of clinical significance.

Approaches for SUV correction, such as resolution recovery based on the system point spread function, are known for remediating these sources of error. However, the resolution recovery can introduce noise and the resulting correction may result in SUV overshoot, which is also problematic for clinical tasks.

In embodiments disclosed herein, a regression neural network is employed to generate an SUV correction factor for each lesion. Inputs to the network typically include a portion of the image containing the lesion and values of reconstruction parameters that are known to impact the SUV error. Another optional input is a delineated boundary of the lesion. Such inputs may alternatively be represented by salient features, for example the image may be represented by a suitable feature vector, while the lesion boundary (if serving as an input) may be represented by a lesion volume and optionally an aspect ratio. Inputting the actual image data and boundary increases the number of inputs and hence complexity of the neural network; inputting corresponding salient features reduces the needed neural network complexity at the cost of some possible reduced accuracy due to information loss.

The neural network is a regression network which outputs the SUV correction factor (as opposed to a classification network which outputs a classification). Numerous neural network architectures may be employed, preferably having 3 or more layers. The regression neural network may, or may not, include feedback paths.

Supervised training of the neural network receives, as training data, images of lesions with suitable ground truth labeling as to SUV values. In an illustrative training approach, experimental PET imaging data from actual patients is modified by adding "synthetic" lesions of known SUV distribution. This can be done using Monte Carlo simulation of 511 keV gamma ray emissions from the synthetic lesion at a desired position in the patient PET image, preferably adjusted for attenuation using the attenuation map (usually from CT) for the patient PET image. (Advantageously, it is commonplace in clinical practice to acquire a CT image of the patient along with the PET image in order to perform attenuation correction during the PET image reconstruction; PET/CT scanners are commercially available and facilitate acquiring a CT image spatially registered with the PET image). The Monte Carlo simulated 511 keV coincidence events are added to the original PET data for the patient, and this combined data set (patient PET data with added lesion simulation data) is reconstructed using the desired image reconstruction parameters (and, again, using the CT image for attenuation correction) to generate the attenuation-corrected reconstructed image converted to SUV units. Thus, the ground truth SUV is known for the simulated lesion, and the "measured" SUV data for that lesion is that of the reconstructed image converted to SUV units. The neural network is trained (e.g., by back-propagation) on the reconstructed image converted to SUV units to optimize the network to output the correction factor adjusting to the known ground truth SUV of the synthetic lesions. In another approach, PET imaging of a phantom with "lesions" of a priori known activity level may be used as the training samples having a priori known ground truth SUV values.

In some embodiments disclosed herein, the lesion boundary is delineated manually or by an automatic segmentation process or by a semi-automatic approach combining these, and the lesion boundary (or volume or other features derived from the boundary) serves as an input to the neural network that outputs the SUV correction factor. In a variant approach, the lesion size is roughly approximated by fitting a 3D Gaussian probability distribution to the lesion, and this approximated lesion size serves as an input to the neural network.

In other embodiments disclosed herein, the lesion boundary or estimated size is not an input, and in this case the neural network may optionally be trained to output both the SUV correction factor and the lesion volume (and/or other lesion size information).

Another optional output of the neural network is a confidence value characterizing the SUV correction factor. Two factors which impact this confidence are: (1) the confidence of the neural network itself; and (2) uncertainty in the lesion boundary or estimated size (for embodiments in which this is an input to the network). In one approach, a confidence value may be generated by rerunning the neural network for designated percentage variations in the input (e.g. for lesion size, 1.05× lesion size, and 0.95× lesion size) and computing the confidence metric as the +/−5% variation values in SUV correction factor yielded for these two neural network runs.

The neural network can be trained offline (e.g. at a factory or on-site during PET system installation or maintenance), and that the trained neural network then applied directly to clinical images to estimate the SUV correction factor.

The neural network may be trained for different anatomical regions and types of lesions (e.g. lung lesions, prostate lesions), or a single neural network may be trained with the anatomy being a parameter input to the neural network. Since the point spread function is dependent upon the type of radiopharmaceutical, this could be another input to the neural network (or, alternatively, different neural networks may be trained for different radiopharmaceuticals).

The output may suitably be the SUV correction factor output by the regression neural network, and/or the corrected SUV value computed by applying the SUV correction to the max- and/or average-SUV values. In some embodiments, the corrected SUV value(s) are displayed along with the uncorrected SUV value(s) for consideration by the clinician. The confidence value (if computed) is also displayed.

The disclosed training methods produce a regression neural network that takes into account the complex SUV dependencies on various (user dependent and independent) impact factors which are captured by a set of appropriate training data. Afterwards, when provided with the matching input from a new PET study being performed for clinical diagnosis or assessment of a patient, the trained regression neural network automatically derives an estimate for the expected numerical mismatch between the SUV value(s) of the lesion generated by the PET imaging study and the actual lesion activity (i.e., the "true" SUV). This mismatch estimate can be applied in order to (a) directly correct for the SUV-max and SUV-mean values displayed to the clinician (which improves the quantitative SUV accuracy, especially in the case of small lesions whose SUV values are most adversely affected by confounding factors such as partial volume effect, system blurriness, and noise. This leads to more precise and reproducible quantitative results in PET-based tumor staging and therapy response assessment) and (b) optionally also provides variability estimations (i.e. confidence values) for the displayed SUV-max and SUV-mean values, related e.g. to the specific lesion shape/size, tracer activity contrast and spatial image noise properties. With smaller lesion sizes, especially when approaching the limit of the targeted scanner's spatial resolution, SUV errors noticeably increase. Thus, the highest benefit can be expected in this application area (i.e. for "small" lesions). However, also the impact of errors in the applied lesion segmentation increase. Consequently, the combination of providing a correction factor together with an indication of how much the proposed/applied correction depends on this (or other) parameter(s), appears most attractive or beneficial. Thereby, clinicians can more easily judge the reliability of the observed SUV quantities derived from different PET (e.g. follow-up) scans e.g. of the same patient.

A deep learning neural network (NN) can help to link between the observed lesion quantification (e.g. SUV measured and the true lesion quantification, i.e., true SUV) by learning from a large pool of training data about the partial volume effect of the imaging chain. For example, an observed lesion with degraded SUV and enlarged size due to partial volume effect. However, this approach may have a feasibility issue that the mapping may not be a one-to-one in reality, when the true lesion size is unknown and especially when the lesion size is comparable to the system's partial volume kernel size. Lesions with different SUV and different sizes can result in a similar observed lesion with the same partial volume effect applied (e.g., a narrow but tall lesion may end up similar to a wide and short lesion). When lesions are large compared to the partial volume kernel then the SUV can be measured accurately which makes the NN prediction less useful.

Although described herein for PET imaging systems, the disclosed approaches can be disclosed in other emission imaging modalities in which a radiopharmaceutical is administered to a patient, such as single photon emission computed tomography (SPECT) imaging systems, hybrid PET/CT or SPECT/CT imaging systems, and the like.

Figure 1:
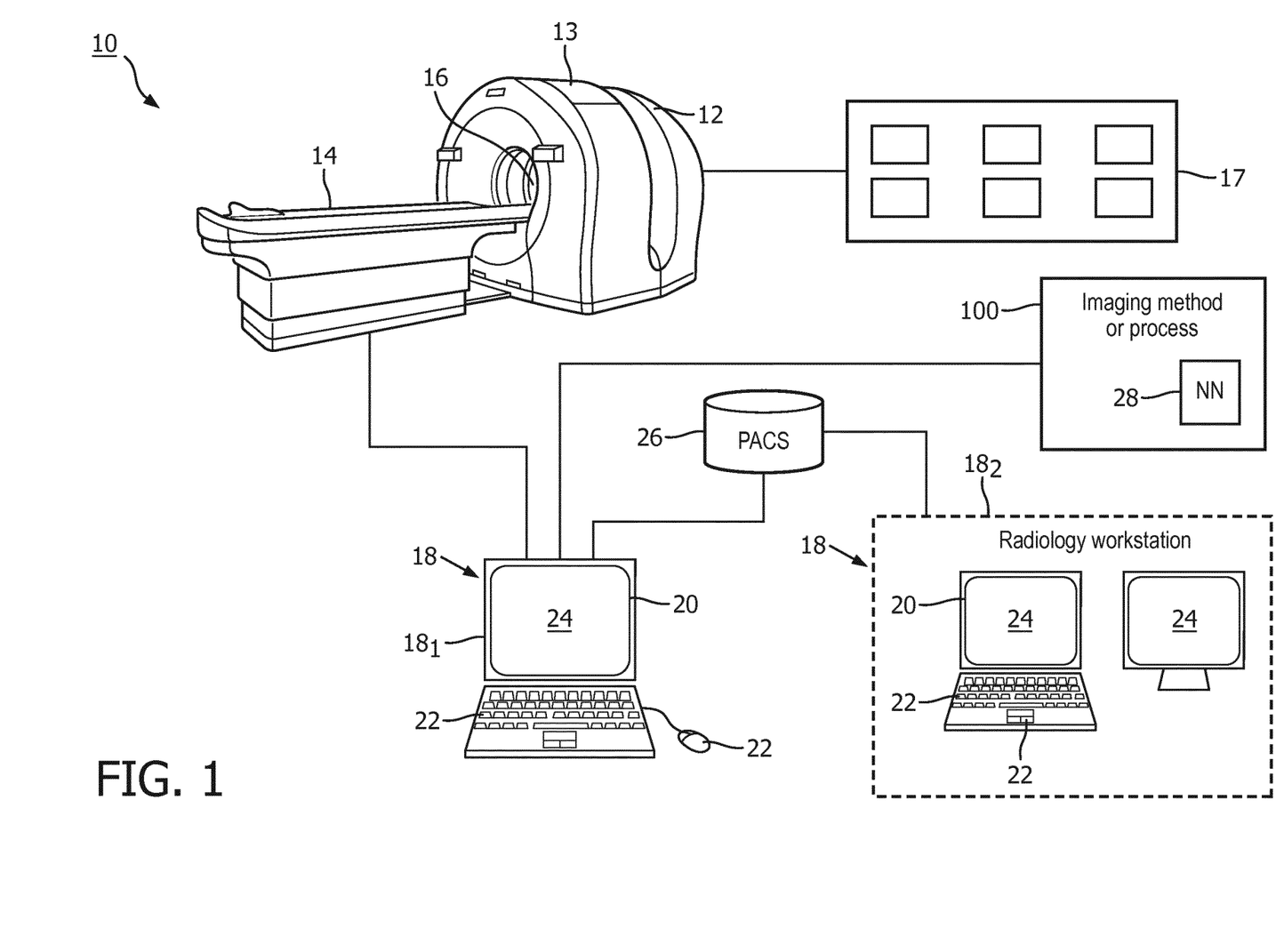
FIG. 1 diagrammatically shows an emission imaging system according to one aspect.

With reference to FIG. 1, an illustrative medical imaging system or device 10 is shown. As shown in FIG. 1, the system 10 includes an image acquisition device 12. In the illustrative example, the image acquisition device 12 comprises a PET gantry of a PET/CT imaging system that also includes a computed tomography (CT) gantry 13. A patient table 14 is arranged to load a patient into an examination region 16 of the PET and/or CT gantries 12, 13. The PET gantry 12 includes an array of (diagrammatically indicated) radiation detectors 17. As noted previously, it is commonplace in clinical PET imaging to acquire both PET imaging data of the patient using the PET gantry 12 and also a CT image of the patient using the CT gantry 13, and an attenuation map is derived from the CT image for use in performing the PET image reconstruction.

The system 10 also includes a computer or workstation or other electronic data processing device 18 with typical components, such as at least one electronic processor 20, at least one user input device (e.g., a mouse, a keyboard, a trackball, a dictation microphone for dictating a radiology report, and/or the like) 22, and a display device 24. In some embodiments, the display device 24 can be a separate component from the computer 18. In a common clinical implementation, the at least one electronic data processing device 18 includes a first electronic data processing device 18$_1$ which serves as an imaging device controller (e.g. a PET scanner controller) and a second electronic data processing device 18$_2$ which serves as a radiology workstation. In a typical workflow, a radiology technician or other medical professional operates the PET scanner 12 using the PET controller 18$_1$ to acquire PET images, and to convert to SUV units (e.g. SUV images and/or average or maximum SUV values for lesions). These imaging study results are stored in a Picture Archiving and Communication System (PACS) 26. The PACS may go by another nomenclature such as a Radiology Information System, RIS, or so forth.

The image processing also employs a neural network (NN) 28 to correct the SUV values as disclosed herein. The NN 28 can be a regression NN that is trained to determine an SUV correction factor for a lesion in images acquired by the PET gantry 12. Data can be input to the NN 28, including (i) image data comprising the emission image or a feature vector representing the emission image, (ii) the at least one SUV value, (iii) a size of the lesion, and (iv) reconstruction parameters used in the reconstructing; (v) an identification of a radiopharmaceutical used in acquiring the emission imaging data; among others. This input data can be processed by the NN 28 to determine the SUV correction factor.

In the illustrative embodiment, a radiologist can operate the radiology workstation 18$_2$ to perform a reading of the PET images, including retrieving (from the PACS 26) and comparing PET images from the current PET study and a previous PET study. For example, the previous PET study may have been performed before commencement of chemotherapy, radiation therapy, or other oncology therapy, while the current PET study may have been performed after such therapy. As another example, during fractionated chemotherapy or radiation therapy the previous and current PET studies may have been performed at different times during the ongoing fractionated therapy. As shown in FIG. 1, each of the PET controller 18$_1$ and the radiology workstation 18$_2$ include one or more display devices 24; the illustrative radiology workstation 18$_2$ includes an illustrative two displays 24, e.g. one for displaying images and the other for displaying the radiology report under draft or other textual information; display tasks may be otherwise distributed amongst the various displays 24. As part of the radiology reading process, the radiologist may invoke an SUV correction estimate employing the neural network 28 to correct the SUV values, or to provide a proposed SUV correction.

While in this illustrative example the neural network 28 is applied at the radiology workstation 18$_2$, in other embodiments it may be applied at the PET controller 18$_1$ as an adjunct to the PET image reconstruction, so that the corrected SUV values or the proposed SUV correction factor is uploaded to the PACS 26 with the imaging study for consideration by the radiologist reviewing the study at the radiology workstation 18$_2$.

The at least one electronic processor 20 is operatively connected with the one or more non-transitory storage media (not shown; such as a magnetic disk, RAID, or other magnetic storage medium; a solid state drive, flash drive, electronically erasable read-only memory (EEROM) or other electronic memory; an optical disk or other optical storage; various combinations thereof; or so forth) which stores instructions which are readable and executable by the at least one electronic processor 20 to perform disclosed operations including performing an imaging method or process 100. In some examples, various portions of the imaging method or process 100 are performed by a technician using the PET controller 18$_1$ and/or by a radiologist operating the radiology workstation 18$_2$, and may be performed at least in part by cloud processing.

Figure 2:
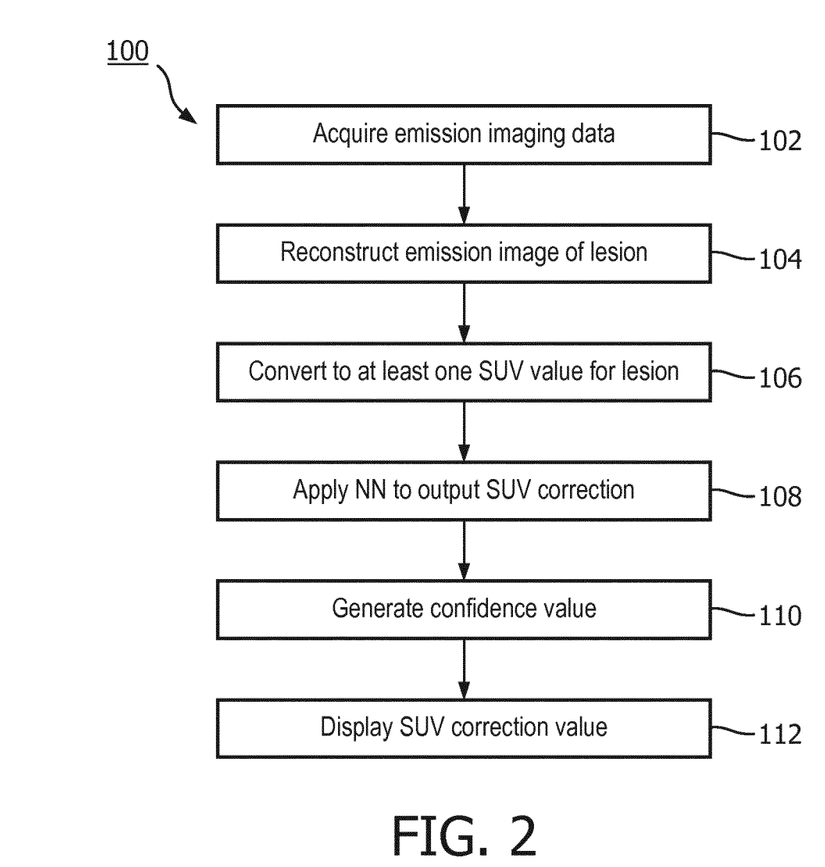
FIG. 2 shows an exemplary flow chart depicting a method of operation of the system of FIG. 1.

With reference to FIG. 2, an illustrative embodiment of the imaging method 100 is diagrammatically shown as a flowchart. At 102, the image acquisition device 12 (e.g., the PET imaging device) is configured, or controlled by the at least one electronic processor 20 (specifically the PET controller 18$_1$ in the illustrative example of FIG. 1), to acquire emission (e.g., PET) imaging data. At 104, the PET controller 18$_1$ is programmed to reconstruct the PET imaging data into PET emission images of a lesion.

At 106, the PET controller 18$_1$ is programmed to converting intensity values of the PET emission image to at least one SUV value for the lesion. (Alternatively, this could be done at the radiology workstation 18$_2$). The SUV value could be, for example, a maximum SUV value anywhere in the lesion; an average SUV value over the lesion, or some other representative SUV value that represents the activity of the lesion as a whole. This statistical value (e.g. max and/or average SUV) could then be corrected using the SUV correction factor. It is also the case that in the SUV image, each voxel (both inside and outside the lesion) can have an SUV value. In other words, the original intensity image is converted to an SUV image by converting the value of each voxel to an equivalent SUV value. So, in an alternative correction sequence, one could apply the SUV correction factor on a voxel-by-voxel basis to correct the SUV value for each individual voxel. Then if the max SUV or average SUV is computed for the lesion using these corrected per-voxel SUV values, the same (corrected) result should be obtained.

The converting of intensity values of the emission image to at least one SUV value for the lesion includes converting an intensity value I to a corresponding SUV value according to Equation (1):

$$SUV(i, D, M, t) = \frac{v_i}{\frac{D}{M} \cdot \left(\frac{1}{2}\right)^{\frac{t}{t_{1/2}}}} \quad (1)$$

where i is the index of a voxel of the PET image, $v_i$ is the value of the voxel i (expressed as a radiotracer activity concentration in the tissue at voxel i, e.g. in units of MBq/mL or equivalent, computed from the raw pixel value based on radioactive source phantom calibration and pixel volume) in the image being converted to SUV values, D is the radiopharmaceutical dose, M is the body mass (or weight) of the patient, t is the wait time between administration of the radiopharmaceutical and the PET imaging data acquisition, and $t_{1/2}$ is the half-life of the radiopharmaceutical. In other contemplated embodiments, the at least one SUV value can be determined by operations described in, for example, (1) Boellaard, *Standards for PET Image Acquisition and Quantitative Data Analysis*, The Journal of Nuclear Medicine, Vol. 50, No. 5 (Suppl), May, 2009, pages 11S-20S; and (2). Kinahan, et al. PET/CT *Standardized Uptake Values (SUVs) in Clinical Practice and Assessing Response to Therapy*, Semin Ultrasound CT MR. December 2010; 31(6): 496-505.

At 108, the PET controller $18_1$ (or, alternatively, the radiology workstation $18_2$, or alternatively a cloud computing resource or other remote computer(s) operatively connected with one of these systems $18_1$, $18_2$) is programmed to processing input data using the regression NN 28 to output an SUV correction factor for the lesion. The input data can include at least two of (i) image data comprising the emission image or a feature vector representing the emission image, (ii) the at least one SUV value, (iii) a size of the lesion, and (iv) reconstruction parameters used in the reconstructing. In some examples, the input data can include at least three of these options. In other examples, the input data can further include (v) an identification of a radiopharmaceutical used in acquiring the emission imaging data.

In some embodiments, when the input data includes a size of the lesion, the size of the lesion can be represented as a delineated boundary of the lesion in the emission image. In one example, via the one or more user input devices 22, the radiology workstation $18_2$ is programmed to receive a manual delineating of the lesion boundary, e.g. using a manual feature contouring graphical user interface (GUI) of a type used to delineate targets and organs-at-risk in radiation therapy planning and like applications. In another example, the radiology workstation $18_2$ is programmed to delineate the lesion boundary by automatic segmentation of the emission image, or by fitting a Gaussian volume to the lesion, or so forth.

In other embodiments, the input data does not include the size of the lesion. In these embodiments, the NN 28 is trained to output a boundary of the lesion and/or a volume of the lesion. The volume of the lesion can be determined by fitting a three-dimensional Gaussian probability distribution to the lesion in the emission imaging data.

At 110, the PET controller $18_1$ (or, alternatively, the radiology workstation $18_2$, or alternatively a cloud computing resource or other remote computer(s) operatively connected with one of these systems $18_1$, $18_2$) is programmed to optionally generate a confidence value for the SUV correction factor. To do so, the PET controller $18_1$ is programmed to apply the NN 28 to repeat processing of the input data with one or more values of the input data varied to perform a sensitivity analysis of the SUV correction factor on the one or more values. In some examples, when the input data includes the size of the lesion, the size of the lesion is varied to perform the sensitivity analysis of the SUV correction factor on the size of the lesion.

At 112, the PET controller $18_1$ (or, alternatively, the radiology workstation $18_2$, or alternatively a cloud computing resource or other remote computer(s) operatively connected with one of these systems $18_1$, $18_2$) is programmed to control the display device 24 to display the SUV correction factor. A corrected SUV value generated by applying the SUV correction factor to the at least one SUV value may also (or alternatively) be displayed on the display device 24. In addition, other parameters that are determined (e.g., the boundary and volume of the lesion, the confidence value, and so forth) can be displayed on the display device 24.

Figure 3:
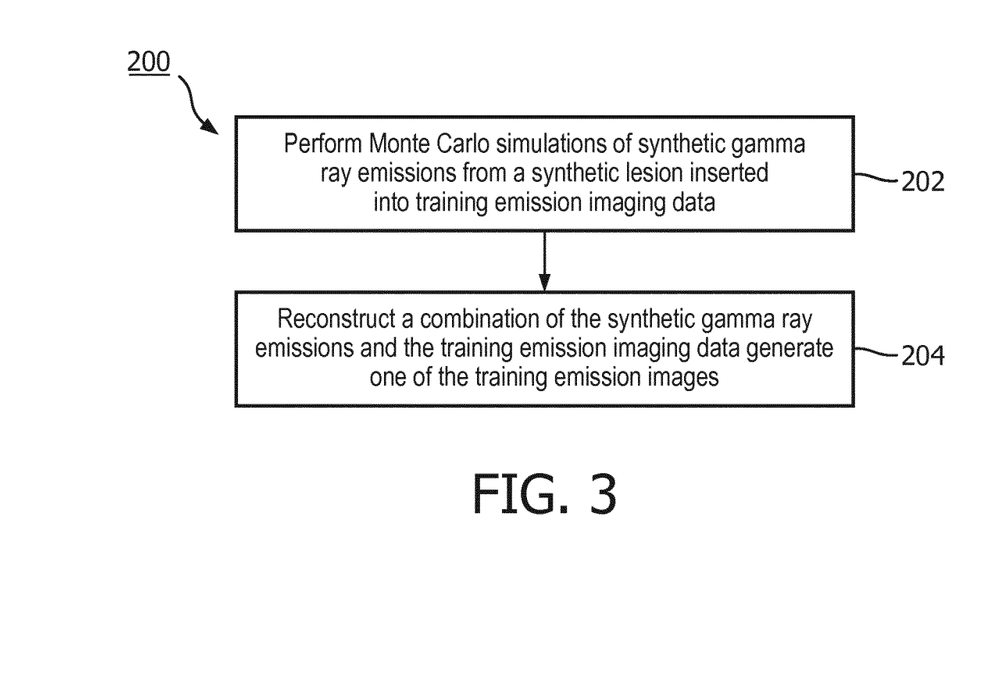
FIG. 3 shows an exemplary flow chart of a suitable approach for generating training data for the neural network of the system of FIG. 1.

With reference to FIG. 3, an illustrative embodiment of a method 200 for generating training data for training the NN 28 is diagrammatically shown as a flowchart. The NN 28 is trained with training emission images of lesions labeled with ground truth SUV values. At 202, Monte Carlo simulations of synthetic gamma ray emissions are performed from a synthetic lesion inserted into training emission imaging data. At 204, a combination of the synthetic gamma ray emissions and the training emission imaging data is reconstructed to generate one of the training emission images which is of the synthetic lesion.

Example 1—Mathematical Model

The NN 28 is programmed to predict true SUV values. A mathematical model (e.g. a 3D Gaussian model) is used to represent lesion profiles and the partial volume blurring kernel, that has a property of one-to-one mapping of the peak value, resolution and so forth, from the blurred model to the original model given the blurring kernel. The NN 28 is then trained using a large number of patient data sets with different patient specs, acquisition time, duration time, statistics and so forth with simulated inserted lesions with known size and SUV. The output of the network is the blurring kernel at different spatial location in the image given different imaging specifications.

For each lesion of interested in a clinical image, the blurring kernel is predicted at the location of the lesion with the given imaging specifications. The 3D Gaussian model is generated based on the profile of the lesion observed in the image. The true SUV of the lesion is predicted using the blurring kernel and the measured lesion profile model. The lesion profile can be modelled based on a Gaussian and total intensity of the lesion measured on the image, and/or based on the lesion size measured on the CT image.

Example 2—Training the NN and Application of the NN

The NN 28 can be trained using training data in which volumetric radiotracer distributions are reconstructed from Monte Carlo-simulated (or measured) PET scan data, considering, for a given PET scanner geometry, a variety of different lesion configurations. During a (batch) image reconstruction, adjustments accessible to the clinicians (changes to the reconstruction, noise-regularization or filtering parameters) are emulated. For each reconstructed image, the regional SUV values are determined using the known lesion mask. Given the ground truth and image-based SUV measures, matching correction factors are determined. Based on these ground truth values, the achieved reconstruction output and the set of adjusted parameters, an Artificial Neural Network (ANN) algorithm is trained to learn the relationship between these provided inputs.

Figure 4:
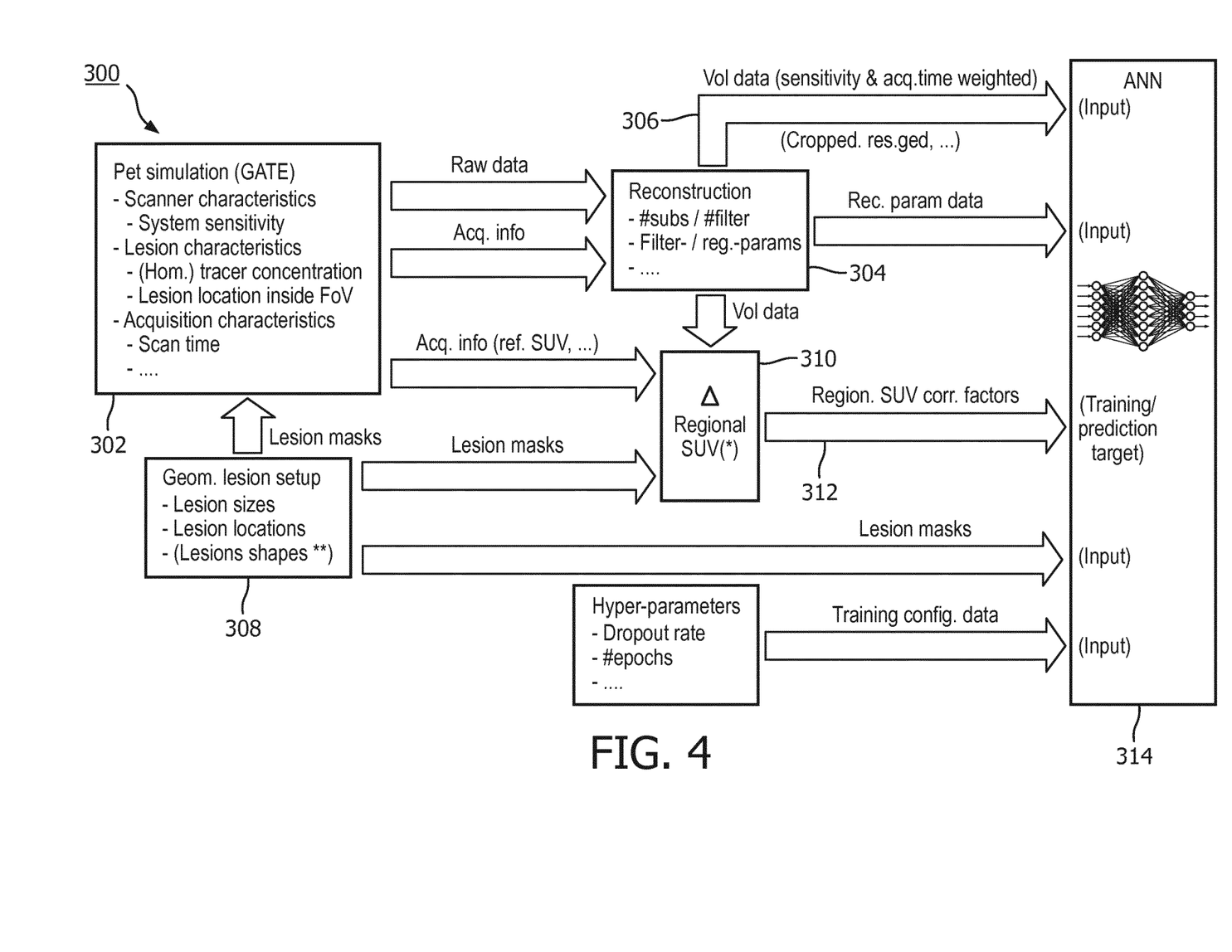
FIG. 4 shows another an exemplary flow chart of a suitable approach for generating training data for the neural network of the system of FIG. 1.

FIG. 4 shows an example method 300 of training the NN 28 depicted as a flow chart. At 302, ground truth data are generated using a particle simulation framework capable to adequately model the process from local positron decay to final coincidence photon detection, such as GEANT4/GATE. The geometrical model considers relevant scanner properties (e.g. detector module setup) of the targeted PET system. In the simulation, the scanner/detector model is combined with a lesion-background-model ("phantom"), considering, among other factors, different (e.g. radial) lesion positions inside the scanners Field-of-View, different lesion extensions (i.e. different radii, if only spherical regions are used; otherwise variations in those parameters characterizing the form/orientation of the applied base-shape in space), different lesion/background material density ratios (similar to lesions in different body tissue types), different lesion/background activity ratios (matching the expected tracer accumulation range for a given radio-tracer, and so forth. In some example, it might be possible to combine multiple variations (e.g. different lesion extensions, or material density values) in one single phantom slice. For individual, relevant radio-isotopes (such as $^{18}F$), the simulation mimics the radiation detection process during various acquisition times, including realistic count statistics (and noise patterns) in the detector data, resulting in individual list-mode data sets.

At 304, each list-mode data set is subsequently reconstructed using the targeted product reconstruction. Thereby, an (application typical) range of clinically available parameter adjustments are applied (all resulting in individual reconstruction results), including different spatial sampling; image resolution settings; different configurations regarding subset size and iteration number; different parameter settings related to image pre-/post-filtering; different configurations affecting (e.g. intrinsic) noise-regularization; and so forth.

At 306, the reconstructed activity distributions are (point-wise) multiplied with the corresponding sensitivity map and weighted with the acquisition time in order to derive an estimate for the spatial distribution of detected decay events. The output is spatially cropped around a lesion and (if required) resampled in order to create a standardized, pre-defined input format for the NN 28. Each input data set further considered is assumed to specify only one lesion.

At 308, the individual lesion definition mask is applied on the reconstructed image data in order to extract the accumulated, regionally recovered tracer amount. Together with the information about the totally "injected" tracer amount and the phantom weight (calculated e.g. from the known sub-volumes and their assigned materials), the image-derived lesion SUV (SUVi) is calculated as usual. Alternatively, also SUV-calibration information extracted from an existing scanner (or an average value from multiple scanner calibrations) may be applied.

At 310, a regional ground truth SUV value (SUVg) is calculated for the individual lesion from the known phantom setup. Again, also SUV-calibration information extracted from an existing scanner (or an average value from multiple scanner calibrations) may be applied.

At 312, for each lesion sample, i.e. each set of individually chosen parameters (generated at 302 and 304) and the resulting reconstructed local tracer distribution (from 306), an SUV correction factor is calculated from 308 and 310 as SUVg/SUVi.

At 314, the mapping between the lesion samples and the individual SUV correction factors is trained (e.g. via back-propagation) to a multilayer-NN. Modern NN architectures applied in image processing, such as (deep) Convolutional Neural Networks (CNNs), typically consist of a stack of individual layers, including convolution layers (convolution-based filtering/feature enhancement), max-pool-layers (dimensionality reduction), fully-connected layers (feature re-combination), etc. They also include additional layers/techniques (such as drop-out and regularization) in order to preserve the ability of ANNs to abstract the feature space based on the seen training examples. Advanced techniques like transfer learning or fine tuning which allow to include public-available pre-trained ANN-layers into a dedicated specific NN could also be considered.

The (iterative) NN weight adaptation can be performed on a single computer or a compute cluster, either using CPU or GPU. Different sources of public available NN modeling toolkits exist (TensorFlow, Torch, Caffe/Caffe2, Keras, and so forth) which allow to create various types of NN structures.

Once trained, the NN 28 can be used to output the SUV correction factor. When presented with new PET study parameter sets and pre-segmented volumetric activity distribution data, the NN 28 responds with SUV correction factors based on the learned parameter space. The correction factor is either directly applied to compensate for the estimated SUV error, or it is displayed along with the un-corrected lesion SUV for subsequent (manual) correction by the clinician. Additional information about the local variability of the estimated SUV correction factors are determined, e.g. via small-range variations in selected parameters (such as the size and-or shape of the lesion segmentation). The SUV variability estimate is (graphically or numerically) displayed along with the corrected or un-corrected SUV evaluation results in order to indicate the "trust level" for the related analysis.

Figure 5:
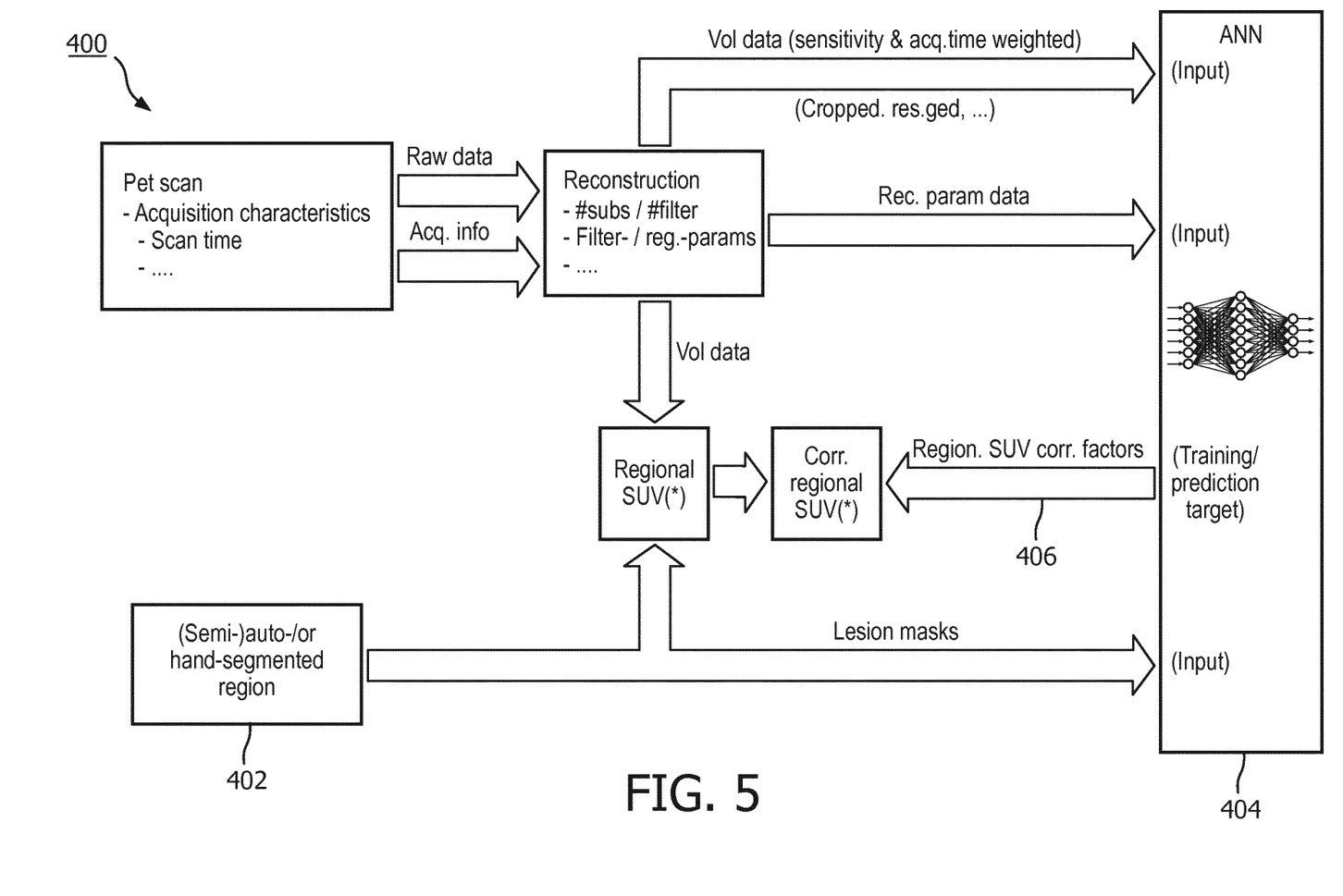
FIG. 5 shows an exemplary flow chart depicting a method of application of the neural network of the system of FIG. 1.

FIG. 5 shows an example method 400 of using the trained NN 28 depicted as a flow chart. At 402, a manual or semi-automatic lesion delineation for the given PET study is performed by the clinician. Using the lesion mask, a weighting and lesion-centric regional cropping and resampling is applied. At 404, a lesion sub-volume together with the reconstruction/acquisition parameter set is fed into the NN 28, which derives an estimate for an appropriate SUV correction factor via a multi-dimensional projection of the provided input into the learned parameter space. At 406, minor (random) shape variations are applied on the used segmentation mask (and also other parameters). The resulting changes in the SUV correction factor output of the NN 28 allows to estimate the reliability of this parameter.

The disclosure has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A non-transitory computer-readable medium storing instructions readable and executable by at least one electronic processor to perform an imaging method, the method comprising:
    reconstructing emission imaging data to generate an emission image of a lesion;
    converting intensity values of voxels of the emission image to standardized uptake values (SUV values) for the lesion, the SUV values being computed as a function of a body mass or weight of the patient, a wait time between administration of the radiopharmaceutical and the PET imaging data acquisition, and one or more of a radiopharmaceutical dose and/or a half-life of the radiopharmaceutical;
    processing input data using a regression neural network to output an SUV correction factor for the lesion, wherein the input data includes at least two of (i) image data comprising the emission image or a feature vector representing the emission image, (ii) the at least one SUV value, (iii) a size of the lesion, and (iv) reconstruction parameters used in the reconstructing; and controlling a display device to display at least one of (I) the SUV correction factor and (II) a corrected SUV value generated by applying the SUV correction factor to the at least one SUV value.

2. The non-transitory computer-readable medium of claim 1, wherein the input data includes at least three of (i) the image data, (ii) the at least one SUV value, (iii) said size of the lesion, and (iv) said reconstruction parameters used in the reconstructing.

3. The non-transitory computer-readable medium of claim 1, wherein the input data includes said size of the lesion represented as a delineated boundary of the lesion in the emission image.

4. The non-transitory computer-readable medium of claim 3, wherein the method further includes one of:
receiving, via one or more user input devices, a manual delineating of the lesion boundary; or
delineating the lesion boundary by automatic segmentation of the emission image.

5. The non-transitory computer-readable medium of claim 1, wherein:
in the processing, the input data does not include (iii) a size of the lesion and the processing of the input data using the regression neural network further outputs a boundary of the lesion and a volume of the lesion; and
the method further includes controlling the display device to display the determined boundary and volume of the lesion.

6. The non-transitory computer-readable medium of claim 1, wherein the method further includes:
generating a confidence value for the SUV correction factor; and
controlling the display device to display the generated confidence value.

7. The non-transitory computer-readable medium of claim 6, wherein generating the confidence value for the SUV correction factor includes:
repeating the processing with one or more values of the input data varied to perform a sensitivity analysis of the SUV correction factor on the one or more values.

8. The non-transitory computer-readable medium of claim 7, wherein in the processing, the input data includes (iii) the size of the lesion, and in the repeating the size of the lesion is varied to perform the sensitivity analysis of the SUV correction factor on the size of the lesion.

9. A non-transitory computer-readable medium storing instructions readable and executable by at least one electronic processor to perform an imaging method, the method comprising:
reconstructing emission imaging data to generate an emission image of a lesion;
converting intensity values of voxels of the emission image to standardized uptake values SUV values) for the lesion, wherein the converting of intensity values of the emission image to at least one SUV value for the lesion includes converting an intensity value I to a corresponding SUV value according to:

$$SUV(i, D, M, t) = \frac{v_i}{\frac{D}{M} \cdot \left(\frac{1}{2}\right)^{\frac{t}{t_{1/2}}}} \quad (1)$$

where i is the index of a voxel of the PET image, $v_i$ is the value of the voxel i expressed as a radiotracer activity concentration in the tissue at voxel i in the image being converted to SUV values, D is a radiopharmaceutical dose, M is a body mass or weight of the patient, t is a wait time between administration of the radiopharmaceutical and the PET imaging data acquisition, and $t_{1/2}$ is a half-life of the radiopharmaceutical;
processing input data using a regression neural network to output an SUV correction factor for the lesion, wherein the input data includes at least two of (i) image data comprising the emission image or a feature vector representing the emission image, (ii) the at least one SUV value, (iii) a size of the lesion, and (iv) reconstruction parameters used in the reconstructing; and
controlling a display device to display at least one of (I) the SUV correction factor and (II) a corrected SUV value generated by applying the SUV correction factor to the at least one SUV value.

10. The non-transitory computer-readable medium of claim 1, wherein the emission imaging data is positron emission tomography (PET) imaging data and the emission image of the lesion is a PET image of the lesion.

11. An imaging system, comprising:
an image acquisition device configured to obtain emission imaging data of a patient; and
at least one electronic processor programmed to:
reconstruct emission imaging data to generate an emission image of a lesion;
convert intensity values of voxels of the emission image to standardized uptake values (SUV values) for the lesion, the SUV values being computed as a function of a ratio D/M of a radiopharmaceutical dose D, to a body mass or weight M of the patient and a ratio $t/t_{1/2}$ of a wait time t between administration of the radiopharmaceutical and the PET imaging data acquisition, and a half-life $t_{1/2}$ of the radiopharmaceutical;
process input data using a regression neural network to output an SUV correction factor for the lesion, wherein the input data includes at least three of (i) image data comprising the emission image or a feature vector representing the emission image, (ii) the at least one SUV value, (iii) a size of the lesion, and (iv) reconstruction parameters used in the reconstructing;
generate a confidence value for the SUV correction factor by repeating the processing with one or more values of the input data varied to perform a sensitivity analysis of the SUV correction factor on the one or more values; and
control a display device to display at least one of (I) the SUV correction factor; (II) a corrected SUV value generated by applying the SUV correction factor to the at least one SUV value; and (III) the generated confidence value.

12. The imaging system of either claim 11, wherein the input data includes said size of the lesion represented as a delineated boundary of the lesion in the emission image, the at least one electronic processor is further programmed to determine the delineated boundary by one of:
receiving, via one or more user input devices, a manual delineating of the lesion boundary; or
delineating the lesion boundary by automatic segmentation of the emission image.

13. The imaging system of claim 11, wherein:
in the processing, the input data does not include (iii) a size of the lesion and the processing of the input data using the regression neural network further outputs a boundary of the lesion and a volume of the lesion; and
the at least one electronic processor is further programmed to:
control the display device to display the determined boundary and volume of the lesion.

14. The imaging system of claim 11, wherein in the processing, the input data includes (iii) the size of the lesion, and in the repeating the size of the lesion is varied to perform the sensitivity analysis of the SUV correction factor on the size of the lesion.

15. The imaging system of claim 11, wherein the at least one electronic processor is programmed to:
convert the intensity values of the emission image to at least one SUV value for the lesion includes converting an intensity value I to a corresponding SUV value according to:

$$SUV(i, D, M, t) = \frac{v_i}{\frac{D}{M} \cdot \left(\frac{1}{2}\right)^{\frac{t}{t_{1/2}}}} \quad (1)$$

where i is the index of a voxel of the PET image, and $v_i$ is the value of the voxel i expressed as a radiotracer activity concentration in the tissue at voxel i in the image being converted to SUV values.

* * * * *